United States Patent [19]
Kunz et al.

[11] 3,861,723
[45] Jan. 21, 1975

[54] V-BAND COUPLING
[75] Inventors: Willis H. Kunz, Chesterfield; Paul R. Hildebrandt, Ballwin, both of Mo.
[73] Assignee: The United States of America as represented by the Secretary of the Air Force, Washington, D.C.
[22] Filed: Aug. 28, 1973
[21] Appl. No.: 392,386

[52] U.S. Cl. .................................. 285/410, 24/279
[51] Int. Cl. ............................................. F16l 23/00
[58] Field of Search .......... 285/367, 410, 411, 365, 285/366, 407, 408, 409; 24/279

[56] References Cited
UNITED STATES PATENTS
2,893,097 7/1959 Hill et al. ............................... 24/279
3,064,327 11/1962 Kaplan ................................. 24/279
3,110,948 11/1963 Voss .................................... 24/279

Primary Examiner—Dave W. Arola
Attorney, Agent, or Firm—Harry A. Herbert, Jr.; Jacob N. Erlich

[57] ABSTRACT

A V-band coupling for joining the abutting ends of tubular sections having a plurality of retainer element surrounding the ends of the tubular sections. A continuous band clamping element is utilized to force the retainer elements into engagement with the tubular sections. In order to fixedly secure this clamping element in place a locking member is used which incorporates therein a pair of cylindrically shaped saddle blocks and a bolt having a head with a flat undersurface. With the above-mentioned elements a V-band coupling with increased fatigue life is produced.

1 Claim, 2 Drawing Figures

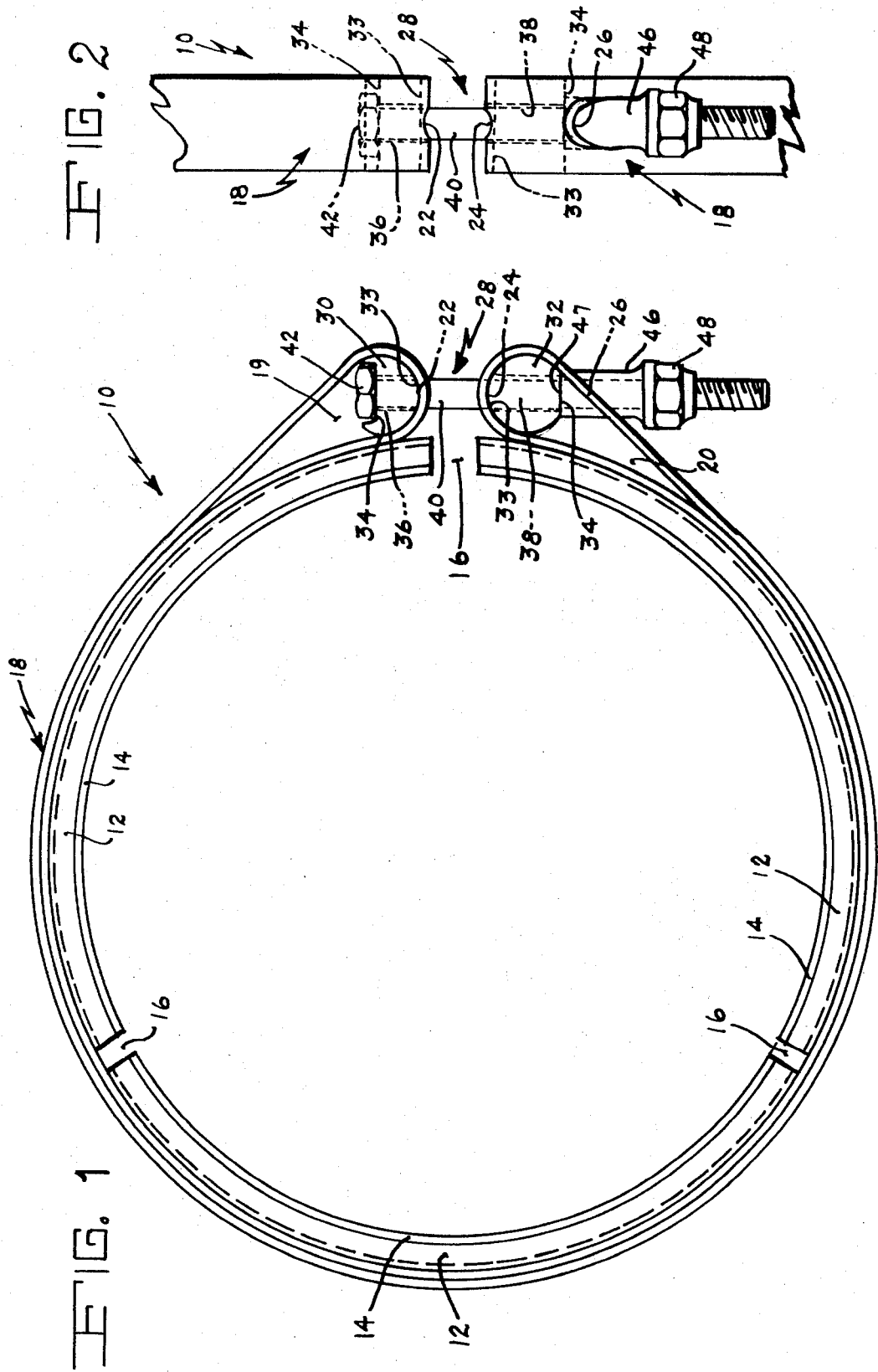

V-BAND COUPLING

BACKGROUND OF THE INVENTION

This invention relates generally to couplings and more particularly to a V-band type coupling which utilizes a continuous surrounding band or strap in conjunction with a locking device capable of withstanding large loads.

V-band couplings are utilized to encircle and grip a pair of tubular or cylindrical members in such a manner as to force them axially into engagement with each other. Their primary function is to clamp adjacent ends of a pair of pipes and force them into end abutting relation with each other to produce a fluid tight joint for conducting ventilating air, liquids or gases. V-band couplings have been successfully used in many industrial applications, as well as in the assembly of aircraft in, for example, securing air ducts in place and/or mounting accessories.

The V-band coupling generally consists of a curved V-shaped inner retainer which is spot-welded to an outer circular flat band or strap which in turn is secured by spot-welding to a pair of straps. Within the pair of straps is installed a "T" bolt which serves to tighten the outer band and the retainer about the tubing flanges. The V-band couplings have the retainer shaped to fit over the flanges of the tubing, being in contact and coextensive with their axially and radially directed nonabutting surfaces so as to draw the abutting surfaces together axially when the "T" bolt is tightened.

The "T" bolt, by its nature concentrates all the bolt tension load into bending of the "T" which is a maximum at the bolt shank/"T" intersection. At this area of the bolt shank/"T" intersection the radius must be small in order to meet the requirements of tension straps having a reasonable width. A larger radius at this juncture would require larger strap widths and would therefore result in higher bending loads on the "T." Failure of the "T" bolts at this area due to fatigue is therefore not uncommon and results in leaks or complete separation of the flanges of the tubing or pipes to be secured together. In fact failures in the threaded portion of the "T" bolt, which is normally the weakest portion of a threaded fastener, are extremely rare.

The bands heretofore utilized in holding the retainer about the tubing flanges have included therein additional straps for holding the above-mentioned "T" bolt. These additional straps have been held in place by spot welding, rivets or the like. It is therefore seen that not only is the "T" bolt under extreme load, but also the strap connections. These weaknesses in V-band couplings of the past have proved to be not only a safety hazard to personnel who operate the equipment which incorporates the V-band clamps therein but also create an economical problem because of their constant replacement.

SUMMARY OF THE INVENTION

The instant invention sets forth a V-band coupling which utilizes a locking member capable of withstanding large loads as well as a continuous surrounding strap or band for the retainer which eliminates the areas of fatigue heretofore in existence.

This invention completely avoids the stress concentration points of the "T" bolt of the past as well as eliminating the bending load imposed on the bar of the "T." This is accomplished by the replacement of the "T" bolt heretofore in use with the locking member of this invention. The instant locking member utilizes a conventional bolt with the load on the head of the bolt evenly distributed under the surface of the head and this load is transferred to the shank of the bolt by pure shear rather than bending. Thus, this invention will demonstrate reliability equivalent to that of a standard bolt in tension.

This is accomplished when the head of the conventional bolt transfers the tension load of the bolt into a saddle block which is cylindrically shaped to fit within the continuous band. The side of the saddle block on which the head of the bolt bears is made with a flat slot or indentation to fit and retain the bolt head and transfer the bolt load into the saddle block. Another saddle block fits into another portion of the continuous band, but this saddle block is made with a flat to accept a sleeve and self-locking nut. Holes through the saddle blocks allow for the bolt to pass therethrough and are normal to the slot or indentation in one of the saddle blocks and the flat in the other saddle block. The webb or strap which supports this locking member is a continuous band which surrounds the retainer. This continuous band therefore increases the fatigue life of the V-band coupling of this invention in that the structural loads are carried by a strap in tension with no intermediate fasteners in shear.

It is therefore an object of this invention to provide a V-band coupling which is extremely reliable in operation and capable of withstanding large loads.

It is another object of this invention to provide a V-band coupling which utilizes a bolt therein in which the load is evenly distributed to the tension band.

It is a further object of this invention to provide a V-band coupling in which the bolt contained within the locking member is non-removable.

It is a still further object of this invention to provide a V-band coupling which is extremely lightweight.

It is another object of this invention to provide a V-band coupling which is economical to produce and which utilizes conventional, currently available components that lend themselves to standard mass producing manufacturing techniques.

For a better understanding of the present invention together with other and further objects thereof reference is made to the following description taken in connection with the accompanying drawing and its scope will be pointed out in the appended claims.

DESCRIPTION OF THE DRAWING

FIG. 1 is a side elevational view of the V-band coupling of this invention; and

FIG. 2 is a plan view of a portion of the V-band coupling of this invention showing in detail the locking member utilized therewith.

DETAILED DESCRIPTION OF THE PREFERRED EMBODIMENT

Reference is now made to FIG. 1 of the drawing which shows a side elevational view of the V-band coupling 10 of this invention. Coupling 10 is made up of a plurality of retainer elements 12 which contain on the underside thereof a V-shaped channel or groove 14 utilized to engage the flanges of the tubing or pipes (not shown) to be joined. Retainer elements 12 are separated by openings or spaces 16 which allow for V-band coupling 10 to be spread apart so that the pipes may be slipped therethrough. It should be noted that although three such retainer elements 12 are shown in the drawing any number can be utilized with this invention, for example, the retainer elements may be in one piece or in four or more segments if desired.

A continuous band 18 is utilized to clamp the retainer elements 12 about the pipes or tubing to be joined. This endless or continuous band 18 is formed by securing together by welding or the like the ends of a strap of any suitable material which is flexible or bendable but not stretchable. Once formed, endless band 18 if laid flat so as to form loops 19 and 20 at each end thereof. At loop 19 an aperture 22 is located within band 18 while at loop 20 a pair of apertures 24 and 26 are located within band 18. Loops 19 and 20 as well as apertures 22, 24 and 26 allow for the insertion of locking member 28 therethrough in a manner to be described in detail hereinbelow. With a continuous band 18 of the type disclosed in this invention, a V-band coupling 10 is produced having an increased fatigue life in that the structural loads are carried by band 18 in tension with no intermediate fasteners in shear as with the V-band coupling of the past.

Reference is now made to FIGS. 1 and 2 of the drawing and in particular to locking member 28. Locking member 28 is made up of a pair of saddle blocks 30 and 32 which are mounted within loops 19 and 20, respectively. Each saddle block 30 and 32 is of similar construction, being formed of a cylindrical configuration 33 at one side thereof and a flat surface or indentation 34 at the other side thereof. Saddle blocks 30 and 32 having openings 36 and 38, respectively, located in the center thereof and aligned with apertures 22, 24, and 26 within band 18. Each aperture 36 and 38 is made normal to respective flat surface 34. A conventional bolt 40 having a flat head 42 at one end thereof and being threaded at the other end is inserted through opening 36 within saddle block 30 and rests flush against the flat surface 34 of saddle block 30. Bolt 40 extends through aperture 22 of band 18 passing still further through aperture 24, opening 38 in saddle block 32 and aperture 26. Once bolt 40 has passed through saddle block 30 and aperture 33 within loop 19, endless band 18 can be spot welded to retainer elements 12 at various locations in order to maintain V-band coupling 10 as an integral unit and to prevent the inadvertent removal of saddle block 30 and bolt 40. It should be noted that these spot welds are not to be utilized for the purpose of structural fasteners. With the locking member 28 of this invention the flat head 42 of bolt 40 transfers the tension load of bolt 40 into saddle block 30 which has outer cylindrical shape 33 to fit within loop 19 of band 18. The side of saddle block 30 on which the flat undersurface of head 42 bears against is also flat at 34 and thereby retains the bolt head 42 and transfers the bolt load into the saddle block 30. Saddle block 32 which is of similar construction to saddle block 30 receives through aperture 38 the threaded end of bolt 40. The outer flat surface 34 of saddle block 32 accepts a sleeve 46 having a flat surface 47 and a conventional self-locking nut 48.

In use, before attaching self-locking nut 48 and sleeve 46, and with bolt 40 and saddle block 30 in place in loop 19, retainer elements 12 of V-band coupling 10 are spread apart sufficiently to allow for the insertion of the pipes to be joined. With the pipes in abutting relationship retainer elements 12 are brought together by means of continuous band 18 and by the passing of bolt 40 through aperture 24 in band 18, opening 38 in saddle block 32, and opening 26 in band 18. Sleeve 46 is then inserted upon bolt 38 and locking nut 48 is threaded upon bolt 38. The V-band coupling 10 of this invention can now be tightened sufficiently to clamp around the pipes to be retained thereby. With the V-band coupling 10 of the instant invention in position, clamped around the pipes, the load is transferred to saddle blocks 30 and 32 which in turn transfer this load evenly to bolt 40. In addition, the continuous band 18 carries this load in tension and thereby produces a V-band coupling with an increased fatigue life over those couplings heretofore in existence.

Although this invention has been described with reference to a particular embodiment it will be understood by those skilled in the art, that this invention is also capable of alternate embodiments within the spirit and scope of the appended claims.

We claim:

1. A coupling for joining the abutting ends of cylindrically shaped members comprising at least one retainer element surrounding the ends of said cylindrically shaped members, means attached to and surrounding said retainer element for forcing said retainer element into clamping engagement about said cylindrically shaped members, said clamping means being formed of a continuous band of flexible material having a pair of loops therein and a locking member located within said loops for fixedly securing said clamping means about said cylindrically shaped members, said locking member being made up of a pair of saddle blocks, each of said saddle blocks being of a cylindrical configuration on one side thereof, having a surface of a predetermined configuration on the other side thereof and having a centrally located opening therethrough, one of said saddle blocks located in each of said loops of said clamping means, said clamping means having a first aperture in one loop thereof and second and third apertures in the other loop thereof, a bolt having a head with an undersurface conformed to said preselected configuration at one end thereof passing through said opening in said saddle blocks and said apertures in said clamping means, the remainder of said continuous band of material being completely solid thereby enabling said one loop to uninterruptingly encircle said bolt head, securing means located at the other end of said bolt, and a sleeve interposed between one of said saddle blocks and said securing means.

* * * * *